United States Patent [19]

Hisaoka et al.

[11] Patent Number: 5,508,017
[45] Date of Patent: Apr. 16, 1996

[54] PROCESS FOR THE PREPARATION OF ACICULAR α-IRON OXIDE HYDRATE

[75] Inventors: Isshi Hisaoka, Tamano; Masahide Shouji, Tamano; Tadayosi Saruwatari, Tamano; Hisasige Ito, Okayama; Makoto Miyaji, Tamano; Yoshinobu Oka, Tamano, all of Japan

[73] Assignee: Mitsui Mining & Smelting Co., Ltd., Tokyo, Japan

[21] Appl. No.: 944,957

[22] Filed: Sep. 15, 1992

[30] Foreign Application Priority Data

Oct. 1, 1991 [JP] Japan .................... 3-278915

[51] Int. Cl.$^6$ .................... C01G 49/06; C04B 35/26
[52] U.S. Cl. .................... 423/633; 423/634; 252/62.58; 252/62.59
[58] Field of Search .................... 423/633, 634; 252/62.58, 62.59

[56] References Cited

U.S. PATENT DOCUMENTS 4,323,464  4/1982  Umeki .................... 423/633
5,076,836  12/1991 Hisaoka et al. .................... 75/349
5,185,093  2/1993  Ichikawa et al. .................... 427/127

FOREIGN PATENT DOCUMENTS 64-33019  2/1989  Japan .................... 423/634

OTHER PUBLICATIONS

Database WPI Derwent Publications Ltd., London, GB; AN 77-91198Y & JP-A-52 134 858 (Kanto Denka Kogyo) * abstract * Feb. 1989.

*Primary Examiner*—Mark L. Bell
*Assistant Examiner*—Scott Hertzog
*Attorney, Agent, or Firm*—Bucknam and Archer

[57] ABSTRACT

A process for the preparation of acicular α-iron oxide hydrate which comprises oxidizing a slurry of ferrous hydroxide having an excessive alkali concentration of 1.0 mol/l or above with an oxygen-containing gas, interrupting oxidation, adding an excessive quantity of an aqueous solution of a salt of aluminate, homogenizing and stirring the resulting mixture, again oxidizing it with an oxygen-containing gas to obtain a slurry containing free aluminate ion and α-iron oxide hydrate, homogenizing and stirring the slurry, then neutralizing and aging it, and washing and drying it.

9 Claims, No Drawings

PROCESS FOR THE PREPARATION OF ACICULAR α -IRON OXIDE HYDRATE

BACKGROUND OF THE INVENTION

1. Field of the Invention

The present invention relates to a process for the preparation of acicular a-iron oxide hydrate useful for the production of acicular ferromagnetic metallic particles which have excellent magnetic properties and good dispersibility and are used for magnetic recording media.

2. Prior Art

For the purpose of improving the magnetic recording density and the playback output, recently, coated type magnetic recording media using ferromagnetic metallic particles comprising pure iron or containing iron as a main component have been put to practice use. Such ferromagnetic metallic particles are prepared, for example, by dehydrating acicular or spindle-shaped α-iron oxide hydrate, thereafter reducing it, and further forming an oxide layer on its surface.

However, such ferromagnetic metallic particles, having poorer magnetic stability, deteriorate more easily with the lapse of time than magnetic iron oxide particles and they are liable to agglomerate to result in poor dispersion, though they have an advantage of higher magnetic recording density.

Further, in the current tendency toward the higher magnetic recording density, the size of ferromagnetic metallic particles is becoming smaller and smaller. Thus, acicular ferromagnetic metallic particles having a mean length of 0.15 µm or below, preferably 0.10 µm or below, good magnetic stability, and good dispersibility are desired. One of the means for solving the problems concerning magnetic stability and dispersibility is to increase the diameter, or in other words to decrease the length to diameter ratio.

In recent years, the gap length of a magnetic head has become smaller and smaller to realize high-density recording. When the gap length of a magnetic head is decreased, the magnetic field in the neighborhood of the gap tends to contain the intense perpendicular component in addition to the longitudinal component. Thus, the magnetic flux distribution in the surface layer of a magnetic recording medium in contact with the head much increases in the direction perpendicular to the medium.

In order to realize high-density recording, accordingly, it is desirable in a magnetic recording medium to make the medium easily magnetizable in the direction perpendicular to the medium. Decreasing the length to diameter ratio of ferromagnetic metallic particles as much as possible is also effective for increasing this perpendicular component.

Japanese Patent Laid-Open Gazette No. 33019/1989 discloses one example of the process for producing acicular α-iron oxide hydrate which is capable of giving the excellent ferromagnetic metallic particles. However, the ferromagnetic metallic particles prepared from the acicular α-iron oxide hydrate obtained by this process have a mean length greater than 0.20 µm and a length to diameter ratio exceeding 10, which is not able to satisfy the requirements of the high magnetic recording density and the good dispersibility.

Japanese Patent Laid-Open Gazette No. 36603/1985 discloses a process for producing a spindle-shaped α-iron oxide hydrate for use in high-density magnetic recording. In the ferromagnetic metallic particles produced from this spindle-shaped α-iron oxide hydrate, the length and the length to diameter ratio are in the above-mentioned desirable ranges. However, they are still inferior in dispersibility.

As has been mentioned above, there has not yet been obtained ferromagnetic metallic particles which are capable of satisfying the requirements of high magnetic recording density in a magnetic recording medium, excellent in dispersibility and capable of retaining magnetic properties, particularly coercivity, on a high level.

SUMMARY OF THE INVENTION

The present invention has been made to solve the above-mentioned problems of the prior art and an object of the present invention is to provide a process for the preparation of acicular α-iron oxide hydrate effectively usable for the production of ferromagnetic metallic particles capable of satisfying the requirements of high magnetic recording density of a magnetic recording medium and excellent in dispersibility without deteriorating the magnetic properties.

The above-mentioned object of the present invention can be achieved by, in the process for the preparation of acicular α-iron oxide hydrate, interrupting the oxidation, adding and dispersing an excessive quantity of an aqueous solution of a salt of an aluminate to suppress the growth of the growing acicular α-iron oxide hydrate crystal in the direction of the length, and again starting the oxidation to make the acicular α-iron oxide hydrate grow only in the direction of the diameter.

Thus, the process of the present invention for producing acicular α-iron oxide hydrate comprises oxidizing a slurry of ferrous hydroxide having an excessive alkali concentration of 1.0 mol/l or above with an oxygen-containing gas, subsequently adding an excessive quantity of an aqueous solution of a salt of an aluminate acid, homogenizing and stirring the resulting mixture, again oxidizing it with an oxygen-containing gas to obtain a slurry containing free aluminate ion and α-iron oxide hydrate, homogenizing and stirring the slurry, neutralizing and aging it, and washing and drying it.

The process of the invention will be described in more detail hereinbelow.

In the invention, a slurry of ferrous hydroxide having an excessive alkali concentration of 1.0 mol/l or above is oxidized with an oxygen-containing gas to obtain a slurry of acicular α-iron oxide hydrate (α-FeOOH).

The slurry of ferrous hydroxide having an excessive alkali concentration of 1.0 mol/l or above can be prepared by thoroughly mixing and stirring an aqueous solution of a ferrous salt and an excessive quantity of an aqueous solution of an alkali. If desired, a nickel salt and/or a manganese salt may be added to the slurry.

As examples of the ferrous salt to be used herein, sulfate, chloride, nitrate, acetate, carbonate and the like can be referred to, among which sulfate is preferable from the viewpoint of the economy and the stability of reaction. Although the alkali is not critical, sodium hydroxide, potassium hydroxide and the like can be referred to as its example. Usually, sodium hydroxide is used for this purpose. As the nickel and manganese salts, the same salts as those mentioned above with regard to the ferrous salt can be used, among which sulfates are preferable for the same reason as that mentioned above. When a nickel salt or a manganese salt is to be added in addition to the ferrous salt, these salts may be added in the form of an aqueous solution of either a mixture of them all or each of them alone.

In the present invention, the quantity of the alkali must be in excess of the total quantity of the ferrous, nickel and manganese salts. Accordingly, the alkali must remain unreacted in the slurrry thus prepared. Specifically, the concentration of the excessive alkali is 1.0 mol/l or above. If it is lower than 1.0 mol/l, the resulting acicular α-iron oxide hydrate crystal tends to form dendrites.

Specifically, the quantities of the components added are, for example, 0.5 to 3.0 l of an aqueous solution of a mixture of 0.1 to 1.0 mol/l of $FeSO_4$, 0 to 0.1 mol/l of $NiSO_4$ and 0 to 0.1 mol/l of $MnSO_4$ per liter of NaOH having a concentration of 4 to 18 mol/l.

After these components have been thoroughly homogenized and stirred, oxidation is carried out. The oxidation is preferably carried out at 20°–40° C. while blowing an oxygen-containing gas such as air, oxygen or the like. If the oxidation temperature is higher than 40° C., the resulting α-iron oxide hydrate crystal tends to form dendrites and cannot form fine particles. If the oxidation temperature is lower than 20° C., the resulting α-iron oxide hydrate tends to be contaminated with foreign substances in an indefinite form. By this oxidation, $Fe(OH)_2$ is slowly converted into FeOOH (i.e. from $Fe^{2+}$ to $Fe^{3+}$).

According to the present invention, the oxidation is interrupted, and then an excessive quantity of an aqueous solution of a salt of aluminate is added. Although the time at which the excessive quantity of an aqueous solution of a salt of aluminate is added may be selected arbitrarily, it is preferably a time when the $Fe^{+3}/Fe^{+2}+Fe^{+3}$ ratio (atomic %) has reached 10–50%. If the $Fe^{+3}/Fe^{+2}+Fe^{+3}$ ratio (atomic %) is lower than 10%, the magnetic properties of the ferromagnetic metallic particles tends to be deteriorated. If the ratio is higher than 50%, the mean length of the resulting α-iron oxide hydrate will be unfavorably too big.

As examples of the salt of aluminate to be used herein, sodium aluminate, potassium aluminate and the like can be referred to. It is necessary herein that the salt of aluminate be added in an excessive quantity and free aluminate ions remain in the slurry after the oxidation. If an aluminum salt such as aluminum sulfate is used, magnetite is apt to be formed, which is undesirable.

Specifically, the salt of aluminate is added preferably in a quantity of 0.05–0.1 l in the form of a 0.2–1.5 mol/l solution of $NaAlO_2$. If the quantity of aluminum, expressed in terms of atomic % based on the amount of iron which is assumed to be 100, is less than 6 atomic %, the mean length of the resulting α-iron oxide hydrate will be too big unfavorably.

According to the present invention, an excessive quantity of an aqueous solution of the salt of aluminate is entirely added during the interruption of the oxidation as mentioned above, whereby the subsequent growth of α-iron oxide hydrate is almost completely restrained in the direction of the length, so that its growth is allowed only in the direction of the diameter.

After adding the excessive quantity of an aqueous solution of the salt of aluminate and thoroughly homogenizing and stirring the resulting mixture, the mixture is again oxidized with an oxygen-containing gas. In this oxidation, the conditions are the same as those adopted in the first oxidation carried out before the addition of an excessive quantity of an aqueous solution of the salt of aluminate.

Thus, a slurry containing free aluminate ion and α-iron oxide hydrate is obtained. The α-iron oxide hydrate obtained herein has a relatively short mean length and a small length to diameter ratio. The outer layer of this α-iron oxide hydrate contains a constant quantity of aluminum.

The preferred contents of nickel, manganese and aluminum in this α-iron oxide hydrate are, in terms of atomic % based on the amount of the iron 0– 10 atomic %, 0–10 atomic %, and 4–10 atomic % respectively.

Subsequently, the slurry containing free aluminate ion and α-iron oxide hydrate is thoroughly homogenized and stirred, and then neutralized with sulfuric acid or the like and aged to obtain a slurry in which the remaining aluminum is deposited on the outer surface of α-iron oxide hydrate. It is also possible to add an aqueous solution of phosphoric acid or its salt and/or an aqueous solution of silicic acid or its salt in the course of the homogenization to deposit phosphorus and/or silicon in addition to the remaining aluminum onto the outer surface of α-iron oxide hydrate. As examples of the salt of phosphoric acid and salt of silicic acid used herein, sodium salt, potassium salt and the like can be referred to.

The quantity of the aqueous solution of phosphoric acid or its salt and/or aqueous solution of silicic acid or its salt to be added herein is as follows. Thus, per liter of an α-iron oxide hydrate slurry, the quantity of $NaH_2PO_4$ is preferably 0.01 l or below in the form of a solution having a concentration of 1.0 mol/l or below, and the quantity of $Na_2SiO_3$ is preferably 0.01 l or below in the form of a solution having a concentration of 1.0 mol/l or below.

Here the content of aluminum and the additionally added phosphorus and/or silicon are, as expressed in terms of atomic % based on the amount of iron, 6.0–15 atomic % and is 0–1.5 atomic % respectively in the finally obtained ferromagnetic metallic particles.

The neutralized and aged slurry of α-iron oxide hydrate is washed and dried to give aclcular α-iron oxide hydrate. The drying Is carried out at 100° to 200° C. for about 12 hours.

For preparing ferromagnetic metallic particles from the acicular α-iron oxide hydrate obtained according to the invention, the acicular α-iron oxide hydrate is dehydrated and then reduced in a reducing gas, and further an oxide layer is formed on its surface. The dehydration is carried out in the open air or in a nitrogen atmosphere at 300° C. to 800° C., preferably at 400° C. to 600° C. The reduction is carried out in a reducing gas such as hydrogen gas or carbon monoxide gas at 450° C. to 600° C. For forming an oxide layer on its surface, it is recommendable to increase the oxygen concentration slowly in a gaseous mixture consisting of an inert gas and oxygen gas and, when the composition of the gas has reached that of the open air, to take out the resulting ferromagnetic metallic particles as a final product.

The ferromagnetic metallic particles thus prepared has an acicular form, and its preferable composition expressed in terms of atomic % based on the amount of the iron is 0–5.0 atomic % of nickel, 0–5.0 atomic % of manganese, 6–15 atomic % of aluminum, and 0–1.5 atomic % phosphorus and/or silicon.

From the standpoint of improving the magnetic stability remarkably, a more desirable composition of the ferromagnetic metallic particles expressed in terms of atomic % based on the amount of iron is 1.0– 5.0 atomic % of nickel, 0.1–5.0 atomic % of manganese, 6.0–15 atomic % of aluminum and 0.6–1.5 atomic % of phosphorus and/or silicon.

Among the ferromagnetic metallic particles obtained according to the present invention, those having a mean length of 0.05–0.15 μm, a mean diameter of 0.018–0.025 μm, a length to diameter ratio of 3–8, and a specific surface area of 40–55 $m^2/g$ are preferably used.

As has been described above, in the process for the preparation of acicular α-iron oxide hydrate, according to the process of the present invention in which oxidation is interrupted and an excessive quantity of an aqueous solution of a salt of aluminate is added and dispersed, acicular α-iron oxide hydrate can be obtained which is suitable for use in the production of ferromagnetic metallic particles which are capable of coping with the today's tendency toward the higher magnetic recording density in the field of magnetic recording media and excellent in dispersibility without deteriorating the magnetic properties.

PREFERRED EMBODIMENTS OF THE PRESENT INVENTION

The present invention will now be described in more detail by referring to the following Examples.

EXAMPLE 1

1.8 l of a 7.8 mol/l aqueous solution of NaOH was mixed with 3.8l of an aqueous solution of a mixture consisting of 0.47 mol/l of $FeSO_4$, 0.014 mol/l of $NiSO_4$ and 0.004 mol/l of $MnSO_4$. After thoroughly homogenizing, diffusing and dispersing the components, air was blown thereinto at a liquid temperature of 25° C. to start oxidation.

When the $Fe^{3+}$/Fe ratio (atomic %) reached 30%, the blowing of air was stopped and nitrogen was blown in its place to interrupt oxidation for a while.

A part of the slurry was taken, washed with dilute hydrochloric acid, filtered and examined under a transmission electron microscope (TEM). It was revealed that the product was fine α-iron oxide hydrate having a mean length of 0.14 µm.

Then, 0.36 l of a 0.5 mol/l aqueous solution of sodium aluminate was added. The quantity of aluminum added at this time was equal to 10 atomic % as expressed in terms of atomic % based on the amount of the iron. After thoroughly homogenizing and diffusing the resulting slurry and dispersing the components, air was again blown to continue oxidation. Thus, α-iron oxide hydrate containing Ni, Mn and Al was obtained. A part of the slurry was taken out and filtered, and the filtrate was analyzed. Thus, it was found that about 30% of the added aluminate ions remained in a state of free ion, and the NaOH concentration was 1.7 mol/l.

To the slurry was added 0.03 l of a 0.5 mol/l aqueous solution of phosphoric acid. After thoroughly homogenizing and stirring the mixture, it was neutralized and aged to deposit aluminum and phosphorus onto the surface of the α-iron oxide hydrate which contains aluminum in its outer layer. A part of the slurry was taken out and filtered, and the filtrate and solid material were analyzed. Thus, it was revealed that all of the free aluminate ions had been deposited onto the surface of α-iron oxide hydrate.

The contents of aluminum and phosphorus expressed in terms of atomic % based on the amount of the iron in the ferromagnetic metallic particles finally obtained, were 10.0 atomic % of aluminum and 0.8 atomic % of phosphorus.

After thoroughly washing the neutralized slurry, it was dried overnight at 100°–120° C. to obtain acicular α-iron oxide hydrate. Its mean length was 0.16 µm, and its length to diameter ratio was 7.

Subsequently, the acicular α-iron oxide hydrate was dehydrated in the presence of air at 600° C. and then reduced by hydrogen gas at 550° C. to obtain acicular ferromagnetic metallic particles. Finally, a stable oxide layer was formed on the surface of the reduced acicular ferromagnetic metallic particles and the product was taken into the open air. Thus, ferromagnetic metallic particles for use in magnetic recording were obtained.

As expressed in terms of atomic % based on the amount of the iron, the composition of the ferromagnetic metallic particles was 3.0 atomic % of nickel, 0.9 atomic % of manganese, 10.0 atomic % of aluminum and 0.8 atomic % of phosphorous.

The ferromagnetic metallic particles thus obtained had a mean length of 0.10 µm, a length to diameter ratio of 5, a coercivity of 1,670 Oe, and good dispersibility.

The mean length and length to diameter ratio were determined by selecting 100 particles which were recognizable as single particles in the TEM photograph, measuring their length and diameters, determining their mean values, and calculating an length to diameter ratio therefrom.

The coercivity was measured with VSM manufactured by Toei Kogyo K.K. at an outer magnetic field of 10 kOe and a packing density of 0.85 g/cm$^3$.

The dispersibility was evaluated by preparing a sheet according to the method which will be mentioned below and comparing its gloss.

The results are given in Table 1.

Preparation of Sheet

| a) | paint composition (parts by weight) | 100 parts by weight |
|---|---|---|
| | pigment (ferromagnetic metallic particles) | |
| | polyurethane resin having sodium sulfonate group | 10 parts by weight |
| | polyvinyl chloride resin | 10 parts by weight |
| | toluene | 150 parts by weight |
| | MEK | 150 parts by weight |
| | cyclohexanone | 40 parts by weight |
| | lubricant | 1 part by weight | b) preparation conditions of paint

The above components were dispersed with a sand mill at 1,500 rpm, for 3 hours.

c) preparation conditions of sheet

The above paint was applied on a base film, oriented and dried at 100° C.

Conditions of Measurement a) gloss

Determined according to JIS Z 8741 at 45° with a glossmeter manufactured by Nippon Denshoku Kogyo K.K..

EXAMPLE 2 TO 9

Acicular α-iron oxide hydrate was prepared by repeating the procedure of the Example 1 under the same conditions except that the quantity of excessive alkali, the contents of nickel, manganese, phosphorus and silicon, the quantity of sodium aluminate and the time of its addition were altered as specified in Table 1.

The acicular α-iron oxide hydrate thus obtained was dehydrated and reduced in a reducing gas and Further an oxide layer was formed on its surface all in the same manner as that of the Example 1. Thus, ferromagnetic metallic particles for used in magnetic recording were obtained.

The results are given in Table 1.

COMPARATIVE EXAMPLE 1

Acicular α-iron oxide hydrate was prepared by repeating the procedure of the Example 1 under the same conditions except that the oxidation was not interrupted and the sodium aluminate was continuously added throughout the period from the start of the oxidation to its end. The acicular α-iron oxide hydrate thus obtained had a mean length of 0.40 μm and a length to diameter ratio of 20.

The acicular α-iron oxide hydrate obtained above was dehydrated and reduced in a reducing gas and an oxide layer was formed on its surface all in the same manner as that of the Example 1. Thus, ferromagnetic metallic particles for use in magnetic recording were obtained.

The ferromagnetic metallic particles obtained herein were the same as those of the Example 1 in composition. Their mean length was 0.29 m, their length to diameter ratio was 14, their coercivity was 1,500 Oe, and their dispersibility was not good.

These results are summarized in Table 1.

COMPARATIVE EXAMPLE 2

Acicular α-iron oxide hydrate was prepared by repeating the procedure of the Example 1 under the same conditions except that the quantity of NaOH added was altered so that altered that the quantity of aluminum was 3 atomic % as expressed in terms of atomic ratio, assuming that of iron was 100. The acicular α-iron oxide hydrate obtained herein had a mean length of 0.32 μm and a length to diameter ratio of 16.

The acicular α-iron oxide hydrate obtained above was dehydrated and reduced in a reducing gas and an oxide layer was formed on its surface all in the same manner as that of the Example 1. Thus, ferromagnetic metallic particles for use in magnetic recording were obtained.

The ferromagnetic metallic particles obtained above were the same as those of the Example 1 in composition, except that aluminum content was lower than in the Example 1. Their mean length was 0.22 μm, their length to diameter ratio was 11, their coercivity was 1,230 Oe, and their dispersibility was not good.

The results are summarized in Table 1.

TABLE 1

| Ex. or Comp. Ex. No. | Conditions of production | | | | | | | Characteristics | | | | | |
|---|---|---|---|---|---|---|---|---|---|---|---|---|---|
| | Excessive alkali (mol/l) | Composition (atomic %) | | | | Time of addn. of sodium aluminate | | Acicular α-iron oxide hydrate | | Ferromagnetic metallic particles for magnetic recording | | | |
| | | Ni/Fe | Mn/Fe | P/Fe | Si/Fe | $Fe^{3+}/Fe$ (atomic %) | Al/Fe (atomic %) | mean length (μm) | length to diameter ratio | mean length (μm) | length to diameter ratio | coercivity (Oe) | gloss |
| Ex. 1 | 1.7 | 3.0 | 0.9 | 0.8 | | 30 | 10 | 0.16 | 7 | 0.10 | 5 | 1670 | 191 |
| Ex. 2 | 1.7 | 3.0 | 0.9 | 0.8 | | 10 | 10 | 0.12 | 5 | 0.06 | 3 | 1550 | 198 |
| Ex. 3 | 1.7 | 3.0 | 0.9 | 0.8 | | 50 | 10 | 0.23 | 10 | 0.14 | 7 | 1640 | 182 |
| Ex. 4 | 1.7 | 3.0 | 0.9 | 0.8 | | 30 | 6 | 0.22 | 12 | 0.13 | 7 | 1580 | 170 |
| Ex. 5 | 1.7 | 3.0 | 0.9 | 0.8 | | 30 | 15 | 0.15 | 7 | 0.11 | 5 | 1660 | 191 |
| Ex. 6 | 1.7 | 3.0 | 0.9 | | 1.0 | 30 | 10 | 0.16 | 7 | 0.10 | 5 | 1690 | 187 |
| Ex. 7 | 1.2 | 3.0 | 0.9 | 0.8 | | 30 | 10 | 0.16 | 6 | 0.11 | 5 | 1610 | 190 |
| Ex. 8 | 1.7 | 1.0 | 0.9 | 0.8 | | 30 | 10 | 0.19 | 7 | 0.13 | 6 | 1590 | 179 |
| Ex. 9 | 1.7 | 3.0 | | 0.8 | | 30 | 10 | 0.17 | 7 | 0.09 | 5 | 1700 | 185 |
| Comp. Ex. 1 | 1.7 | 3.0 | 0.9 | 0.8 | | continuous addition | 10 | 0.40 | 20 | 0.29 | 14 | 1500 | 125 |
| Comp. Ex. 2 | 0.5 | 3.0 | 0.9 | 0.8 | | 30 | 10 | 0.18 | 6 | 0.13 | 5 | 1370 | 140 |
| Comp. Ex. 3 | 1.7 | 3.0 | 0.9 | 0.8 | | 30 | 3 | 0.32 | 16 | 0.22 | 11 | 1230 | 109 |

NaOH concentration was reduced to 0.5 mol/l. Although the acicular α-iron oxide hydrate herein obtained had a mean length of 0.18 μm and a length to diameter ratio of 6, it had many dendrites.

The acicular α-iron oxide hydrate obtained herein was dehydrated and reduced in a reducing gas and an oxide layer was formed on its surface all in the same manner as that of the Example 1. Thus, ferromagnetic metallic particles for use in magnetic recording were obtained.

The ferromagnetic metallic particles thus obtained were the same as those of the Example 1 in composition. Their mean length was 0.13 μm, their length to diameter ratio was 5, their coercivity was 1,370 Oe, and their dispersibility was not good.

The results are summarized in Table 1.

COMPARATIVE EXAMPLE 3

Acicular α-iron oxide hydrate was prepared by repeating the procedure of the Example 1 under the same conditions except that the quantity of sodium aluminate added was so

What is claimed is:

1. A process for the preparation of acicular α-iron oxide hydrate which consists of a) mixing an aqueous solution of a ferrous salt with an aqueous solution of an alkali hydroxide in a molar excess with respect to the molar amount of said ferrous salt of at least 1.0 mole per liter to obtain a first slurry of ferrous hydroxide and unreacted alkali;

b) partially oxidizing said first slurry from step a) with an oxygen containing gas at a temperature of 20°–40° C. to partially oxidize said ferrous hydroxide to acicular α-iron oxide hydrate of formula FeOOH and to obtain a second slurry;

c) interrupting the oxidation at a stage when the ratio $Fe^{+3}/Fe^{+2}+Fe^{+3}$ is 10–50% whereby said acicular α-iron oxide hydrate grows only in the direction of the diameter and does not grow in the length direction and adding an aqueous solution of an aluminate salt in an excess of 6 atomic per cent of aluminum with respect to the total iron present as Fe+++ and Fe++ whereby a third slurry is obtained;

d) homogenizing, stirring and oxidizing said third slurry from step b) with an oxygen containing gas whereby a fourth slurry containing free aluminate ion and α-iron oxide hydrate is obtained;

e) homogenizing and stirring said fourth slurry from step d), neutralizing said slurry with an acid and then aging, washing and drying to obtain acicular α-iron oxide hydrate having aluminum deposited on the outer surface thereof.

2. The process according to claim 1 wherein ferromagnetic metallic particles are obtained from the acicular α-iron oxide hydrate which have a mean length of 0.05–0.15 μm, a mean diameter of 0.018–0.025 μm, a length to diameter ratio of 3–8, and a specific surface area of 40–55 m²/g.

3. A process for the preparation of acicular α-iron oxide hydrate which consists of a) mixing an aqueous solution of 0.1–1 mole per liter of a ferrous salt containing at least one of a nickel salt and a manganese salt in the amount of up to 0.1 mole per liter of said nickel salt and up to 0.1 mole per liter of said manganese salt with an aqueous solution of an alkali hydroxide in a molar excess with respect to the molar amount of said ferrous salt, to obtain a first slurry of ferrous hydroxide, at least one of nickel hydroxide and manganese hydroxide and unreacted sodium hydroxide;

b) partially oxidizing said first slurry from step a) with an oxygen containing gas at a temperature of 20°–40° C. to partially oxidize said ferrous hydroxide to obtain a second slurry containing acicular α-iron oxide hydrate of formula FeOOH;

c) interrupting the oxidation at a stage when the ratio

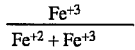

is 10–50% whereby said acicular α-iron oxide hydrate grows only in the direction of the diameter and does not grow in the length direction and adding to said second slurry from step b) an aqueous solution of an aluminate salt in an excess of 6 atomic per cent of aluminum with respect to the total iron present as Fe+++ and Fe++ whereby a third slurry is obtained;

d) homogenizing, stirring and oxidizing said third slurry with an oxygen containing gas whereby a fourth slurry containing free aluminate ion and α-iron oxide hydrate is obtained;

e) homogenizing and stirring said fourth slurry from step d), neutralizing said slurry with an acid and then aging to obtain acicular α-iron oxide hydrate containing at least one of nickel and manganese oxide and having aluminum deposited on the outer surface thereof.

4. The process according to claim 3 wherein in step a) 0.5–3 liters of said aqueous solution contains 0.1–1.0 mole/liter of FeSO₄, 0–0.1 mole/liter of NiSO₄ and 0–0.1 mole/liter of MnSO₄ per liter of NaOH having a concentration of 4–18 mole/liter.

5. The process according to claim 4, wherein in step c) 0.05–0.1 liter of a 0.2–1.5 mole/liter of NaAlO₂ is added.

6. The process according to claim 3 wherein in step d) said fourth slurry contains at least one of nickel and manganese and aluminum and the respective amounts are 0–10 atomic %, 0–10 atomic per cent and 4–10 atomic %.

7. A process for the preparation of acicular α-iron oxide hydrate which consists of a) mixing an aqueous solution of 0.1–1 mole per liter of a ferrous salt containing at least one of a nickel salt and a manganese salt in the amount of up to 0.1 mole per liter of said nickel salt and up to 0.1 mole per liter of said manganese salt with an aqueous solution of an alkali hydroxide in a molar excess with respect to the molar amount of said ferrous salt, to obtain a first slurry of ferrous hydroxide, at least one of nickel hydroxide and manganese hydroxide and unreacted sodium hydroxide;

b) partially oxidizing said first slurry from step a) with an oxygen containing gas at a temperature of 20°–40° C. to partially oxidize said ferrous hydroxide to obtain a second slurry containing acicular α-iron oxide hydrate of formula FeOOH;

c) interrupting the oxidation at a stage when the rati

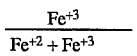

is 10–50% whereby said acicular α-iron oxide hydrate grows only in the direction of the diameter and does not grow in the length direction and adding to said second slurry from step b) an aqueous solution of an aluminate salt in an excess of 6 atomic per cent of aluminum with respect to the total iron present as Fe+++ and Fe++ whereby a third slurry is obtained containing free aluminate and α-iron oxide hydrate;

d) homogenizing, stirring and oxidizing said third slurry from step c) with an oxygen containing gas whereby a fourth slurry is obtained;

e) homogenizing said fourth slurry from step d) and adding at least one of an aqueous solution of phosphoric acid or a salt thereof in an amount of 0.01 liter in the form of a solution of concentration up to 1.0 mole/liter and an aqueous solution of silicic acid or a salt thereof in an amount up to 0.01 liter in the form of a solution of concentration up to 1.0 mole/liter, per liter of said fourth slurry, stirring, neutralizing said slurry, aging to obtain acicular, α-acicular, α-iron oxide hydrate containing aluminum and at least one of phosphorus and silicon deposited on the outer surface thereof.

8. The process according to claim 7 wherein said acicular α-iron oxide hydrate contains at least one of 6.0–15% atomic % of phosphorus and 0. up to 1.5 atomic % of silicon deposited on the outer surface thereon.

9. The process according to claim 7 wherein ferromagnetic metallic particles are obtained from the acicular α-iron oxide hydrate which have in terms of atomic % based on the amount of the iron 0–5.0 atomic % of nickel, 0–5.0 atomic % of manganese, 6–15 atomic % of aluminum, and 0–1.5 atomic % of at least one phosphorus or silicon.

* * * * *